(12) United States Patent
Boucadair et al.

(10) Patent No.: US 8,514,843 B2
(45) Date of Patent: Aug. 20, 2013

(54) METHOD OF PROPAGATING MULTIPLE IP TELEPHONY ROUTES, AND A CORRESPONDING LOCATION SERVER AND COMPUTER PROGRAM

(75) Inventors: Mohamed Boucadair, Caen (FR); Pierrick Morand, Bretteville sur Odon (FR)

(73) Assignee: France Telecom, Paris (FR)

( * ) Notice: Subject to any disclaimer, the term of this patent is extended or adjusted under 35 U.S.C. 154(b) by 1123 days.

(21) Appl. No.: 12/297,771

(22) PCT Filed: Apr. 20, 2007

(86) PCT No.: PCT/FR2007/051152
§ 371 (c)(1),
(2), (4) Date: Oct. 20, 2008

(87) PCT Pub. No.: WO2007/122356
PCT Pub. Date: Nov. 1, 2007

(65) Prior Publication Data
US 2009/0080414 A1 Mar. 26, 2009

(30) Foreign Application Priority Data
Apr. 21, 2006 (FR) ...................................... 06 03625

(51) Int. Cl.
*H04L 12/66* (2006.01)
(52) U.S. Cl.
USPC .......................................................... 370/352
(58) Field of Classification Search
None
See application file for complete search history.

(56) References Cited

U.S. PATENT DOCUMENTS

| 7,028,092 | B2 * | 4/2006 | MeLampy et al. | 709/230 |
| 7,565,448 | B1 * | 7/2009 | Schlesener et al. | 709/242 |
| 7,624,175 | B1 * | 11/2009 | Schlesener et al. | 709/224 |
| 2002/0169887 | A1 | 11/2002 | MeLampy et al. | |

FOREIGN PATENT DOCUMENTS

WO          02058349          7/2002

OTHER PUBLICATIONS

Rosenberg, J. et al: "Usage of TRIP in Gateways for Exporting Phone Routes", IPTEL Working Group, Internet Draft, draft-rs-trip-gw-03.txt, Nov. 2001.
Rosenberg, J. et al: "A Framework for Telephony Routing Over IP", Network Working Group, Request for Comments: 2871, Category: Informational, Columbia University, Jun. 2000.
International Search Report of Counterpart Application No. PCT/FR2007/051152 filed Apr. 20, 2007.
International Preliminary Report on Patentability and English translation of Written Opinion dated Dec. 3, 2008, for corresponding International Application No. PCT/FR2007/051152, filed Apr. 20, 2007.

* cited by examiner

*Primary Examiner* — Chi Pham
*Assistant Examiner* — Kouroush Mohebbi
(74) *Attorney, Agent, or Firm* — David D. Brush; Westman, Champlin & Kelly, P.A.

(57) ABSTRACT

A method is provided for propagating routes between a first location server of a first IP telephony domain and a second location server of a second IP telephony domain. The method includes the following stages: the first location server receives a first propagation message from at least one neighboring location server and containing at least two routes enabling a destination to be reached, referred to as propagation routes; and the first location server advertises the at least two routes to at least one second location server of a second telephony domain neighboring the first.

14 Claims, 6 Drawing Sheets

METHOD OF PROPAGATING MULTIPLE IP TELEPHONY ROUTES, AND A CORRESPONDING LOCATION SERVER AND COMPUTER PROGRAM

CROSS-REFERENCE TO RELATED APPLICATIONS

This Application is a Section 371 National Stage Application of International Application No. PCT/FR2007/051152, filed Apr. 20, 2007 and published as WO 2007/122356 on Nov. 1, 2007, not in English.

STATEMENT REGARDING FEDERALLY SPONSORED RESEARCH OR DEVELOPMENT

None.

The Names of Parties to a Joint Research Agreement

None.

FIELD OF THE DISCLOSURE

The present disclosure relates to the field of telephony over Internet type networks. More particularly, the present disclosure relates to managing routes that enable management entities of telephony domains to have available a plurality of routes to a given destination for the purpose of conveying calls.

In particular, the disclosure relates to propagating routes between management entities of telephony domains on networks that implement, by way of example, a communication mechanism based on the Internet protocol (IP).

The IP network is a backbone network adopted by operators for pooling the heterogeneous services they offer, including IP telephony, commonly referred to as voice over IP (VoIP), or more generally grouped under the heading of conversational services.

The deployment of such real time voice or video applications towards an all-IP network, and also the migration of the public switched telephone network (PSTN) thereto are constraining operators to provide global coverage for these services on a worldwide scale. This means that it is necessary not only to provide points of presence all over the globe, but also that it is necessary to give clients the option of calling any destination (including clients of other operators). This global coverage can be achieved by establishing interconnection agreements with other third-party service providers in order to extend the scope of a service outside the administrative borders of each service provider.

On these lines, it is expected that co-operation between providers of VoIP/ToIP (telephony over IP) services will intensify in the short and medium term. This intensification should enable traffic associated with voice to be delivered to termination points that lie outside any one IP telephony administration domain (ITAD) managed by a single operator. Such co-operation between service providers is particularly important since conventional bilateral type agreements do not make it possible to obtain the global coverage that operators require.

In addition, offers of telephony deployed over an IP network need to satisfy quality constraints such as high availability and good tolerance to faults. The service availability constraint applies not only to telephony domains (i.e. the service layer), but also to the nodes that manage routing of IP streams (i.e. the transfer level).

Below in this document, the terms "quality of service" and "QoS" are used interchangeably to designate the same concept. Reference is also made to the following terms:

LS (location server): this is an entity of a telephone domain (ITAD) that manages the client locations and routes of a local ITAD. This equipment can interface with a neighboring LS in order to discover the locations of clients managed by other ITADs;

AS (autonomous system): this is a set of IP resources managed by a single administrative entity, also referred to as an IP connectivity provider. In the context of the border gateway protocol (BGP, RFC1771) for routing between domains, each AS is identified by a unique identifier. Such an AS is also referred to as an IP transfer domain. In this document, the term "transfer layer or level" designates the network and transport OSI layers.

BACKGROUND OF THE DISCLOSURE

1. Prior Art

In "conventional" telephony (public switched telephone network, PSTN), telephony operators establish bilateral agreements to extend the global coverage of the telephone service. The level of coverage achieved depends essentially on the number of agreements made. In outline, it can be considered that two categories of telecommunications operator are in existence: local and/or national operators, and global operators. The major global operators make a large number of agreements and can thus reach most existing destinations. Local operators make only a small number of agreements, including only one or two with major operators. Thus, a incumbent national operator in a developing country will make agreements with other national operators and one or two agreements with global operators in order to deliver calls to the rest of the world.

At present, most operators are migrating their PSTN networks to solutions and infrastructures that are based on the IP network. To accompany the deployment of VoIP services, the Internet engineering task force (IETF) has undertaken a large amount of standardization work. Several protocols have been specified, amongst which mention can be made of session initiation protocol (SIP), session description protocol (SDP), real-time transfer protocol (RTP), real-time transfer control protocol (RTCP), multimedia gateway control protocol (MGCP), session advertisement protocol (SAP), and telephony routing over IP (TRIP, RFC3219). These protocols satisfy different requirements and in particular they incorporate call signaling and control, the exchange and control of media streams, and the exchange of call routing information.

For more information about the TRIP protocol, reference can be made to standardization document RFC3219. It is particularly in the context of that RFC3219 specification that an embodiment of the present invention lies.

TRIP enables interconnected ITADs to exchange all of the destinations they can reach, thereby facilitating the selection of the gateways that are the most appropriate for delivering IP telephony traffic to the PSTN. The TRIP protocol is implemented by location servers (LS) that propagate TRIP routes containing attributes that serve to describe the routes in question. The use of this particular protocol is independent of the type of signaling protocol deployed for actually setting up calls. The TRIP protocol can be used together with SIP, H.323, or any other signaling protocol.

Each LS maintains a local routing database known as the telephony routing information database (TRIB). This routing database is fed with advertisements received from neighboring LSes (from another telephony domain, for example). The operation of the TRIP protocol is similar to that of the BGP protocol. Advertisements between neighboring LSes are made in the form of route update messages, referred to simply as update messages. Such a message is defined by the TRIP protocol and it is exchanged between LSes in order to inform an LS in the same domain or in a neighboring domain about routes that are available.

Activation of the TRIP protocol between various ITADs is described with reference to FIG. 1 (for reasons of simplicity, the term "domain" is also used to denote an ITAD), each ITAD being administered by a single telephony operator. Each of these operators has one or more LSes and one or more proxy servers (PS). Each LS maintains a routing database that it feeds with advertisements received from its neighbors (situated in other domains) and from LSes in its own domain. These advertisements are updated and forwarded to other neighbors when agreements permit this. Each PS is responsible for setting up calls and processing signaling messages received from clients or from other PSes. In FIG. 1, only the LSes are shown.

Thus, ITAD4 14, for example, updates the advertisements received from ITAD5 15 and forwards them to ITAD3 13. It should be observed that an ITAD is not necessarily deployed on a single IP transfer domain, also referred to an AS.

From the routing point of view, an LS handles three types of route:
- external routes, received from LSes situated in neighboring ITADs;
- internal routes, received from LSes situated in the same ITAD; and
- local routes, configured locally in each LS for injection into TRIP processes. This operation is performed either by static configuration or by redistributing information coming from other routing protocols.

Thus, four types of TRIB are managed by an LS, as is shown in FIG. 2. These tables exist in a single LS, and the relationship between the tables are described with reference to FIG. 2.

- Adj-TRIBs-In 22 (adjacent TRIB in): stores routing information conveyed by update messages. This routing information, also referred to as "routes", constitutes the input to a route selection process 21 (decision process). A given LS maintains an adjacent TRIB-In table 22 for each neighboring LS in which it stores all of the route advertisements received from an adjacent LS;
- Ext-TRIB 24 (external TRIB): a single external TRIB table is maintained by an LS. This table contains the results of a route selection process applied to external routes 25 (Adj-TRIBs-IN) and local routes 26. Prior art techniques enable only one route to be selected per destination;
- Loc-TRIB 20 (local TRIB): this table contains the local routes that result from applying routing policies that are local to each LS; and
- Adj-TRIBs-Out 23 (adjacent TRIB out): these are the routes that the local LS will advertise to its peers.

At this stage, TRIP enables a single unique route to be stored per destination in the local TRIB. This route is the route that is advertised to the peers of a given LS, i.e. to the neighboring LSes (which may be in the same ITAD, or in a different ITAD), providing an agreement exists between them). To do this, TRIP implements a route selection process to determine the best route for storing in its local TRIB. If a route to the destination already exists, then the selection process is invoked. If the new route is selected by the process, the new route replaces the old route in the local TRIB.

2. Drawbacks of the Prior Art

A drawback of that prior art technique is the absence of means for managing the resilience of routes advertised by the TRIP protocol or means for managing load sharing between a plurality of TRIP routes serving the same destination.

In the present technique, if a route exists, a single unique route is advertised, for a given destination. Unfortunately, in the context of VoIP/ToIP, it is recommended to have a (dynamic) backup route or alternative routes for reasons of load sharing and for emergency use in order to ensure that the service has high availability, close to five nines, other than static routes.

The present state of the art does not enable such a backup or load sharing service to be provided because the local telephony routing table does not store any alternative routes to a given destination.

SUMMARY

An aspect of the present disclosure relates to a method of propagating routes for at least one digital stream to a telephony destination, the method being performed by a first location server suitable for managing the locations of clients of a first IP telephony domain.

According to an embodiment of the invention, such a method comprises the following stages:
- said first location server receiving at least two telephony routes from at least one neighboring server enabling a telephony destination to be reached, referred to as propagation routes, received by a propagation message; and
- said first location server advertising said at least two propagation routes to at least one second location server of a second telephony domain neighboring the first.

Thus, routes are propagated by means of a plurality of location servers forming parts of neighboring telephony domains. Within such a domain, the first location server receives by means of a first propagation message at least two propagation routes serving a single destination. It can then advertise at least two routes to the location server of the neighboring telephony domain.

In a particular implementation of the invention, it is also possible that the location server receives only one updated route.

According to an original characteristic of an embodiment of the invention, said method comprises:
- a prior stage of negotiating a multiple telephony route management capability as a function of at least one predetermined parameter with said at least one second location server; and
- a prior stage of negotiating a number of propagation routes to exchange serving a common destination between said first location server with said at least one second location server.

The location server can implement the propagation method in application of a plurality of parameters. It is then necessary for the location servers to proceed with a negotiation stage in order to be informed about their capability to exchange multiple routes. Thus, the location servers agree on a maximum number of routes to be exchanged and on an exchange capability.

In a particular aspect of an embodiment of the invention, said stage of receiving at least two telephony routes enabling said destination to be reached comprises the following steps:
- receiving at least one update message containing said at least two propagation routes;

selecting amongst said propagation routes at least one route for conserving in accordance with at least one predetermined propagation route selection parameter; and adding said at least one route for conserving to a service route database.

The location server can thus select propagation routes as a function of determined parameters. Thus, it receives an update message from the other location server, which message includes at least two routes. It then selects at least one route to be conserved within a database that is specific thereto in order to be able to use it and/or propagate it subsequently.

According to an original characteristic of an embodiment of the invention, said step of selecting at least one route for conserving takes account of at least one marking parameter coming from said at least two propagation routes.

The location server is thus capable of selecting the propagation routes as a function of parameters that are intrinsic to the routes, and for example an indicated route preference.

An embodiment of the invention also provides a method of signaling routes towards a telephony destination, the method being performed by a first proxy server of a first IP telephony domain and suitable for processing signaling messages received from clients of said first telephony domain or from another proxy server, said IP telephony domain including at least a first location server.

According to an embodiment of the invention, such a method comprises the following steps:
  said first proxy server receiving from said first location server at least two telephony routes enabling said destination to be reached, referred to as service routes;
  said first proxy server selecting a route for propagating amongst at least two service routes received from said first location server, referred to as the selected service route;
  said first proxy server inserting into a first propagation message a list of successive IP telephony domains through which said selected service route; and
  said first proxy server sending said first propagation message to the proxy server of an IP telephony domain placed in said list.

A telephony domain includes at least one proxy server and at least one location server. Within the domain, the location server receives, by means of a first signaling message, at least two propagation routes serving a single destination. In order to reach the destination, the first proxy server interrogates the location server. The location server has capabilities that enable it to send two service routes to the proxy server. In the prior art, location servers could only deliver a single route to the proxy server. The proxy server is thus in a position to select the service route it desires to propagate to the other proxy servers. Thus, it inserts the selected service route into a second signaling message that it broadcasts to another proxy server.

In an aspect of an embodiment of the invention, said first signaling message is implemented using the SIP protocol, and it includes at least one attribute serving to specify a list of IP telephony domains through which said selected service route passes.

Thus, the proxy servers comply with the standard SIP signaling protocol.

In another aspect of an embodiment of the invention, the signaling method comprises:
  a stage of receiving a second propagation message coming from a second proximity server;
  a stage of extracting from said second propagation message said list of IP telephony domains through which said selected service route passes;
  a stage of updating said at least one list of IP telephony domains when said first domain attached to said first proximity server is identified within said list; and
  a stage of searching for a route serving said destination when said first domain is not identified within said list.

In order to propagate and update a list of routes, the proxy server thus extracts a list of telephony domains through which the supplied routes pass. Furthermore, if the telephony domain of the proxy server forms part of the list of domains of the route, the proxy service updates the list of domains. If it does not form part of the list, the proxy server searches within a database specific thereto for a route that serves said destination in order to be in a position to provide a plurality of routes to the following proxy server.

Naturally, these stages can equally well be implemented by the second proxy server when it receives a message coming from the first (or any other proxy server), and by the first proxy server when it receives a message coming from another server.

An embodiment of the invention also provides a location server of a first IP telephony domain that is suitable for propagating at least one digital stream towards a destination.

According to an embodiment of the invention, such a location server comprises means for:
  receiving at least two telephony routes from at least one neighboring location server enabling said destination to be reached, referred to as propagation routes, by means of a first propagation message; and
  advertising said at least two propagation routes to at least one second location server of a second telephony domain neighboring the first.

More generally, such a location server includes means for implementing the steps of the routing propagation method, as described above.

The method also provides a proxy server of a first IP telephony domain, and suitable for processing signaling messages received from clients of said first telephony domain or from another proxy server, said IP telephony domain including at least a first location server.

According to an embodiment of the invention, such a proxy server comprises means for:
  receiving from said first location server at least two routes enabling said destination to be reached, referred to as service routes;
  selecting a route for propagation amongst said at least two service routes received from said first location server, referred to as the selected service route;
  inserting into a first signaling message a list of successive IP telephony domains through which said selected service route passes; and
  sending said first signaling message to the proxy server of an IP telephony domain placed at the head of said list.

According to a particular aspect of an embodiment of the invention, such a proxy server comprises means for:
  receiving a second signaling message coming from a second proxy server;
  extracting from said second signaling message said list of IP telephony domains through which said selected service route passes;
  updating said at least one list of IP telephony domains when said first domain attached to said proxy server is identified within said list; and
  searching for a route serving said destination when said first domain is not identified within said list.

More generally, such a proxy server includes means for implementing the steps of the route signaling method as described above.

Thus, such a proxy server is suitable for signaling routes towards a telephony destination and has means for signaling multiple telephony routes within telephony domains.

In an implementation, an embodiment of the invention also relates to a computer program product downloadable from a communications network and/or stored on a computer-readable medium, and/or executable by a microprocessor.

According to an embodiment of the invention, in at least one implementation, such a computer program product includes program code instructions for executing the route propagation method as described above.

In an implementation, an embodiment of the invention also relates to a computer program product downloadable from a communications network and/or stored on a computer-readable medium, and/or executable by a microprocessor.

According to an embodiment of the invention, in at least one implementation, such a computer program product includes program code instructions for executing the route signaling method as described above.

An embodiment of the invention also provides a propagation signal for implementing the route propagation method.

According to an embodiment of the invention, such a signal comprises a first propagation message for said first location server and including data representing at least two routes enabling said second domain to be reached.

An embodiment of the invention also provides a signaling signal for implementing the method of signaling routes.

According to an embodiment of the invention, such a signal includes a second signaling message created by said first proxy server for said second IP telephony domain, and including data representative of a list of successive IP telephony domains through which said selected service route passes.

BRIEF DESCRIPTION OF THE DRAWINGS

Other characteristics and advantages appear more clearly on reading the following description of a preferred implementation, given merely by way of non-limiting illustrative element, and with reference to the accompanying drawings, in which.

DETAILED DESCRIPTION OF ILLUSTRATIVE EMBODIMENTS

Figure 1:
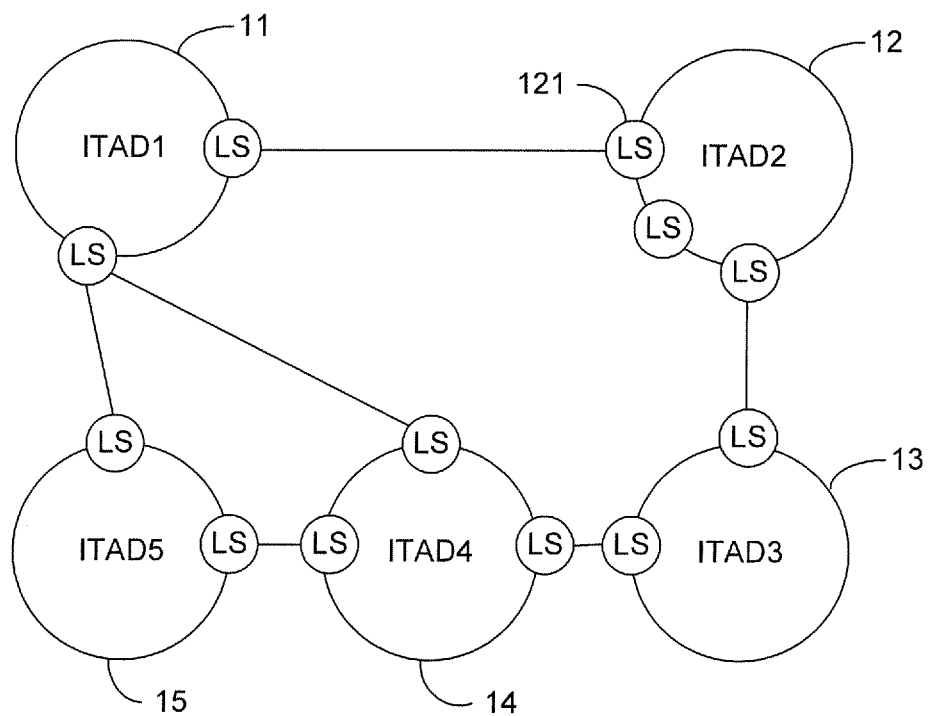
FIG. 1 described with reference to the prior art shows an example of the architecture of a network with TRIP protocol activation.
Figure 2:
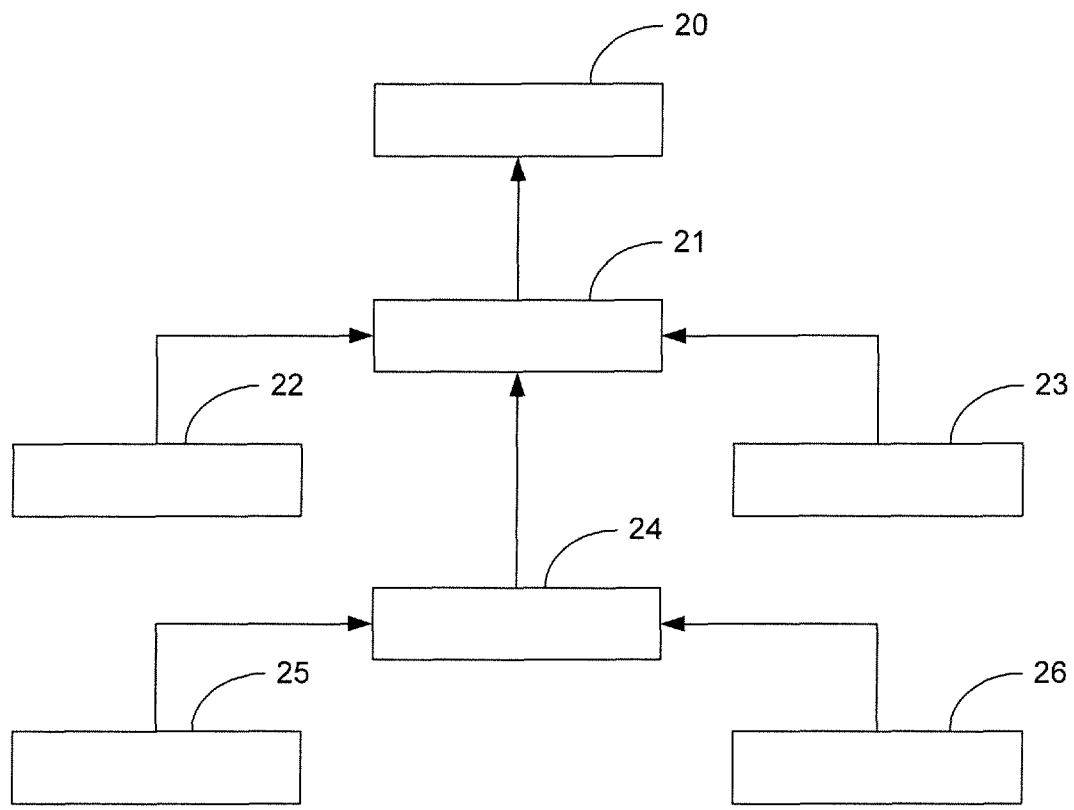
FIG. 2 shows the structure of routing databases (TRIBs) used by location servers routing calls in the telephony domains (ITAD) shown in FIG. 1.

For greater clarity, there follows a description of an implementation of the invention in which the TRIP protocol is implemented in the service layer. Nevertheless, it is clear that the invention is not limited to this particular protocol, and applies also to any new protocol for exchanging routes between IP telephony operators.

1. Recap of the Principle of an Embodiment of the Invention

An embodiment of the invention thus proposes providing telephony over IP platforms with means that are simple and effective for mitigating failure of a link failure, unavailability of a route (in the sense of routing a telephone call), or indeed phenomena of congestion. An embodiment of the present invention does not specify how multiple routes are used to avoid congested links or to activate load sharing. A detailed description is given only of the innovative method that consists in enabling a plurality of routes to a single destination to be propagated and in enabling them to be stored in local telephony routing tables. The use of multiple routes is not limited to QoS or to load sharing, but can be applied to other needs. Consequently, this description does not put a limit on how multiple routes are used.

The general principle of an embodiment of the invention rests on a mechanism referred to as "multiple routing" that acts, by activating the TRIP protocol between the LSes of different ITADs, to identify and propagate the various possible routes to a given destination amongst distinct ITADs.

In order to avoid closing TRIP sessions because of an attribute exchange or because of messages that do not comply with the TRIP RFC, the standard RFC 3219 suggests exchanging the "capabilities" of each LS during the opening of the TRIP session by means of update messages and avoiding exchanging only the attributes supported by two peer LSes. Thus, each LS informs its neighbor of the options that it supports, and must never send it messages that cannot be correctly interpreted by its neighbor. Otherwise, the TRIP session will be closed.

In the context of an embodiment of this invention, a novel "capability" TRIP attribute is introduced, referred to as "multiple route capability", and a novel "TRIP route" attribute format is also introduced.

This "multiple route capability" attribute has the purpose of informing TRIP peer LSes about support for multiple routes by the TRIP instance that is active when the TRIP session is opened. Without this stage of negotiation, the TRIP session would run the risk of being closed if a peer LS were to send "TRIP Routes" that do not comply with the format defined in the RFC3219 specification. Once the capabilities negotiation stage has been successful, two peer LSes can exchange update messages containing modified "TRIP Route" attributes. Consequently, the TRIP protocol supports multiple routes to a single destination.

It is shown below that the description of the modified "TRIP Route" attribute indicates whether the route in question is the route selected by the local LS (i.e. the route selected by the conventional TRIP route selection process) by giving the "Flag" field (described below) the value 1. This indication serves to inform the neighboring LS of the local preference between multiple routes. Without any other indication from the neighboring LS, this route is used by default to convey traffic to the final destination. Other values can be specified for this field for the purpose of characterizing the advertised route. Such values are not specified in this document.

It should be observed that in TRIP terminology, a route denotes a list of destination addresses (each address is defined by an address family indicator (AFI) and a prefix), in association with an application protocol such as SIP or H.323.

Each route is associated with a set of attributes such as "NextHopServer", AdvertisementPath", and "RoutedPath", with the meanings of these attributes set out in detail in RFC3219 respectively in paragraphs 5.3, 5.4, and 5.5. These attributes serve to guide the choice of routes for installation in the TRIBs.

2. Detailed Description

2.1 "Multiple Route Capability"

Figure 3:
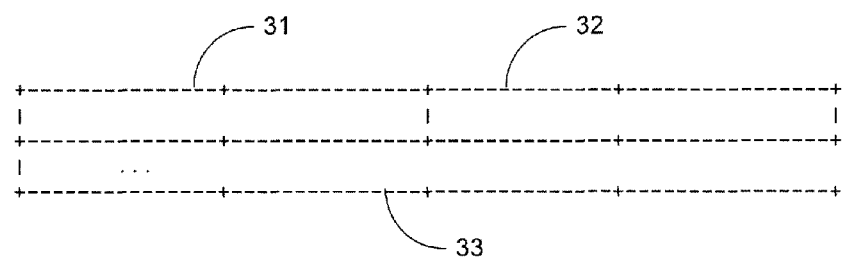
FIG. 3 shows the format of a "capability" attribute.

On starting a TRIP session between two neighboring LSes, the LSes exchange their respective "capabilities" in terms of the extensions they support, in the manner described in RFC3219. The format of the optional attribute, i.e. the "capability" attribute is described in FIG. 3. It should be observed that this attribute is optional and is not necessarily supported by all TRIP implementations.

It contains three fields 31, 32, and 33:
- a "capability code" first field 31 having a length of two octets contains a code identifying the "capability";
- a "capability length" second field 32 likewise having a length of two octets contains the length of the "capability"; and finally
- a "capability value" third field 33 of variable size contains the value of the "capability".

In order to avoid errors while exchanging update messages containing modified "TRIP Route" attributes, so as to avoid closing TRIP sessions, and in order to impart multiple route support to the peers of a given LS, a new "capability" is introduced referred to as "multiple route capability" for which the "capability code" is equal to 3.

Figure 4:
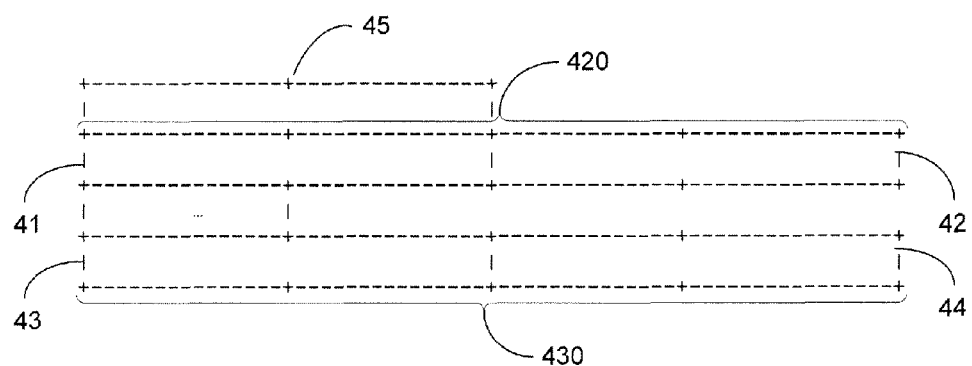
FIG. 4 shows the format of a "capability value" field of a new "multiple route capability" attribute specific to an embodiment of the invention.

The format of the "capability value" field 33 of the "capability information" attribute specific to the "multiple route capability" is shown in FIG. 4. It contains firstly a "max of multiple route" field 45 having a size of two octets.

Furthermore, it includes a series of "address family" fields 41 and of "application protocol" fields 42, each of these two fields having a size of two octets. An LS peer can inform its neighbors about the types of addresses that are supported and that will be used when filling in the fields of the TRIP routes. One or more (address family, application protocol) pairs can be provided. With reference to FIG. 4, a first pair 420 is made up of fields 41 and 42 and a second pair 430 is made up of fields 43 and 44, for example.

The meanings of the "address family" and "application protocol" fields 41, 42, 43, and 44 are the same as those described in Section 5.1.1 of RFC3219, and they are described in detail as an annex to the present description.

The "max of multiple routes" field 45, which is an unsigned integer, specifies the maximum number of multiple routes for a single destination that is supported by a local LS. The number of multiple routes advertised by an LS must not exceed the smaller of the max of multiple routes in the local LS and in its neighbor (i.e. min(max(local LS), max(neighbor LS))).

2.2 The Modified "TRIP Route" Attribute

Figure 5:
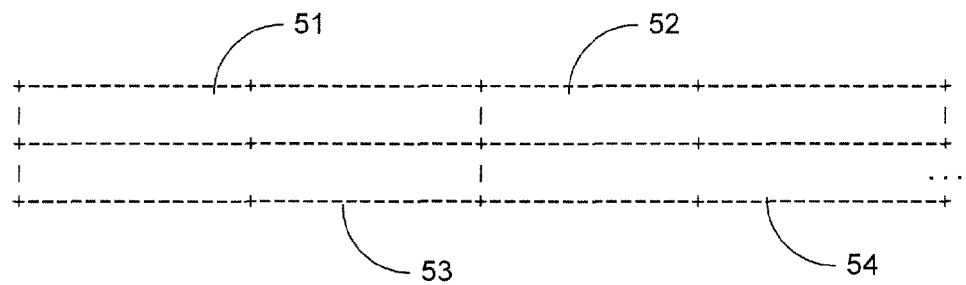
FIG. 5 shows the conventional format of the "TRIP route" attribute according to the RFC3219 specification.

The present specification of the TRIP protocol makes it possible to select and advertise a single unique route per destination (if one exists). The format of the "TRIP Route" attribute as defined by RFC3219 is shown in FIG. 5.

It contains four fields 51, 52, 53, and 54 corresponding respectively to "address family", to "application protocol", to "length", and finally to "address". The first three fields 51, 52, and 53 presents a size of two octets each, while the last field 54 is of variable size.

Figure 6:
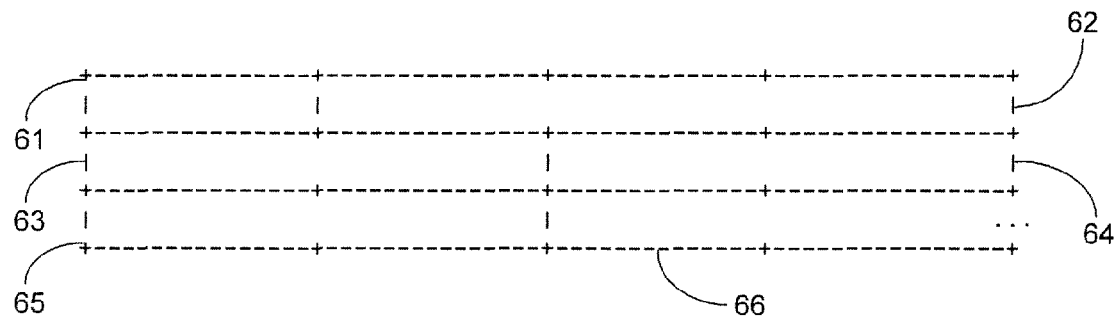
FIG. 6 shows the format of the "TRIP route" field as modified by an embodiment of the invention.

In an embodiment of the invention, in order to enable a plurality of TRIP routes serving a single destination to be advertised, the "TRIP Route" attribute is modified as shown in FIG. 6.

It has six fields, numbered 61 to 66, having the following names and sizes:
- a "flag" field 61 with a size of one octet;
- a "path identifier" field 62 with a size of three octets;
- an "address family" field 63 with a length of two octets;
- an "application protocol" field 64 with a length of two octets;
- a "length" field 65 with a length of two octets; and
- an "address" field 66 of variable length.

The fields "address family", "application protocol", "length", and "address" are defined in Section 5.1.1.1 of the RFC3219 standard, and provided as an annex to the present description.

The new fields of an embodiment of the invention have the following meanings:
- the "flag" field 61 is used to characterize the route being advertised. In the context of an embodiment of this invention, the value "1" is used to inform neighboring LSes that this route is the route selected by the local TRIP process. This serves to inform the neighboring LS about local preference when there are multiple routes. Unless indicated to the contrary by the neighboring LS, this is the route that will be used by default to convey traffic to the final destination. Other values can be specified as a function of needs. For example, in a particular embodiment, this flag can give information about quality of service. In another embodiment, in which all of the network links are made secure, the flag can specify whether the route is a main route or secondary (backup) route;
- the "path identifier" field 62 is provided to distinguish paths serving the same destination, i.e. one or more prefixes. This field contains a value given by the telephony operator. This value depends on TRIP implementations and has only a local meaning.

2.3 General Propagation Procedure

It is recalled that the standard version of the TRIP protocol provides for routes to be exchanged between two neighboring LSes via an update message. The update message has a certain number of attributes. One of these attributes, a "TRIP Route" attribute, contains routes associated with data destinations.

Only one route is advertised per destination since the route selection process is capable of selecting only one route (also referred to as the best route).

In an embodiment of the invention, an LS advertises to its peer/neighbor LSes, multiple routes serving the same destination by sending an update message containing a plurality of "TRIP Route" attributes that have been modified in the manner described in the section above. Each "TRIP Route" is associated with specific route attributes such as the paths of the ITADs (the two attributes that give this type of information are "AdvertisementPath" and "RoutedPath"), the next hop (given by the "NextHopServer" attribute), etc. All of these routes serve the same destination.

The selected route is marked by the "flag" field. Unless some other indication is given by its TRIP neighbor (i.e. the LS with which it has established a TRIP session), this route is used by default to deliver the corresponding traffic. The maximum number of routes to be advertised per destination is negotiated on opening the TRIP session by using the "multiple route capability" described in the above section.

When an LS receives all of the possible routes sent by its neighbor LS, it does not systematically replace the routes that have already been selected by the conventional route selection process. A local LS selects which routes to install in its local TRIB as a function of its local selection policy. This policy is developed in the following section of the present description. The identifier of an inter-ITAD route is local to each ITAD.

The TRIP implementation that supports multiple routes must maintain an association between the routes given in the "Adj-TRBI-In" and "Loc-TRIB" tables. With reference to FIG. 1, described in the introduction to this description, it is supposed that ITAD1 11 advertises to ITAD5 15 two routes to a destination D that is attached to ITAD3 13, these routes being identified by "path identifiers" having values of "1" and "2". The same destination D is then advertised by ITAD4 14 to ITAD5 15 with a route identifier equal to "1". If the process local to ITAD5 15 has previously taken the decision to select the route having the identifier "2", as advertised by ITAD1, and the route advertised by ITAD4 14 in the TRIB local to ITAD5 15, then these two routes can then be marked respectively by "1" and by "2".

2.4 Selecting Multiple Routes

In order to support multiple routes, the TRIP route selection process is not modified. The process undertakes to select the best route to a given destination in compliance with the specifications set out in the RFC3219 specification.

Nevertheless, that conventional selection process is assisted by another mechanism for multiple route selection that is performed over all of the routes received from the neighboring location servers (LS). This new mechanism serves to decide whether a route needs to be added to the list of multiple routes, and consequently whether to integrate this route in the local TRIB without replacing the route selected by TRIP (i.e. the conventional route selection process).

The route selection process may be configured by an administrator of an LS that executes TRIP protocol, by specifying certain parameters, as listed below:
 activate or deactivate the multiple route mechanism;
 the maximum number of multiple routes for a given destination;
 it is only external routes that are concerned;
 it is necessary for multiple routes to come from the same neighboring LS.

The multiple route selection process is designed to take account of additional information, for example:
 having the same preference as the route selected by the TRIP route selection process, i.e. having the same value for the "LocalPreference" attribute. This attribute makes it possible to specify a preference for one route compared with other routes;
 having the same preferred length of "AdvertisementPath" or of "RoutedPath" as the route selected by the TRIP route selection process; and
 having the same value for the "MultiExitDisc" attribute as the route selected by the TRIP route selection process.

2.5 Signaling the Selected Route

In the context of telephony over IP, information contained in the TRIBs guide voice call servers in selecting the path to follow in order to reach a given number.

For example, in a service platform that uses the SIP protocol, the proxy server questions the local LSes about the availability of routes for reaching a given prefix. When the multiple route procedure is activated between neighboring ITADs, two situations can arise:
 in a first situation, if the proxy server has selected the route selected by the conventional TRIP route selection process, there is no impact on SIP messages. The SIP request then follows the inter-ITAD path selected by the conventional TRIP route selection process;
 however, if the proxy server has selected a route other than that selected by the conventional TRIP route selection process, then the "Route" field of the "SIP" messages is given a value so as to align it with the "RoutedPath" attribute of the route selected by the proxy server.

In order to make this possible, the proxy servers insert a "Route" header of value that is deduced from the list of ITAD_PATH segments and specified by the "RoutedPath" attribute. For this purpose, the "Route" field of the SIP protocol, as defined by the RFC3261 standard, is modified in order to introduce the following variables: "ITAD_PATH"; "ITAD_identifier"; and "ITAD_Id".

There follows a description of an example of the syntax for the "Route" field as defined by a conventional BNF grammar, and containing the modifications of an embodiment of the invention as compared with the RFC3219 standard:
 Route="Route" ":" 1#name-addr [route-extension];
 name-addr=[display-name] "<" addr-spec ">";
 display-name=*token|quoted-string;
 addr-spec SIP-URL|URI|ITAD_PATH;
 SIP-URL "sip:" [userinfo "@"] hostport url-parameters [headers];
 ITAD_PATH="itad_path=" ITAD_identifier;
 ITAD_identifier=*(ITAD_id ",")
 ITAD_id=1*32DIGIT;

Concerning the "ITAD_id" field, the values 0 to 255 are reserved. These values need to be assigned by the Internet Assigned Number Authority (IANA), which organization handles the allocation of numbers required by the RFCs of the IETF.

ITAD_PATH is a list of identifiers of ITADs through which the "SIP" messages will pass in order to reach a given destination.

When a SIP proxy receives a SIP request with a "Route" header for which the value is a list of ITAD identifiers, the proxy must verify whether or not the identifier of the domain to which it belongs is present in the list of ITADs. If it is, the proxy updates the list of ITADs by eliminating its own identifier from the list. The SIP proxy must then find a route for reaching the first domain of the list (the SIP proxy invokes the LS of its own domain in order to find this route). If its identifier is not present in the list, the SIP proxy does not modify the "Route" header of the received message, but it needs to find a route to the first domain of the list given in "Route", and the SIP request then follows the selected route. If the received SIP message does not contain a "Route" header, then the SIP proxy proceeds with the conventional routing mechanism.

Thus, by means of the multiple route propagation process of an embodiment of the present invention, a location server (LS) can store, advertise, and receive more than one TRIP route for a given single destination. In various possible applications in which the method can be implemented, these multiple routes may be used by applications using the "SIP" protocol, for example.

Furthermore, since it is possible to have a plurality of routes in the TRIBs, this reduces phenomena of oscillation and instability in routing tables. These phenomena are smaller than in the context of a system that proposes only a single route for any given destination.

3. Example Implementation

Figure 7:
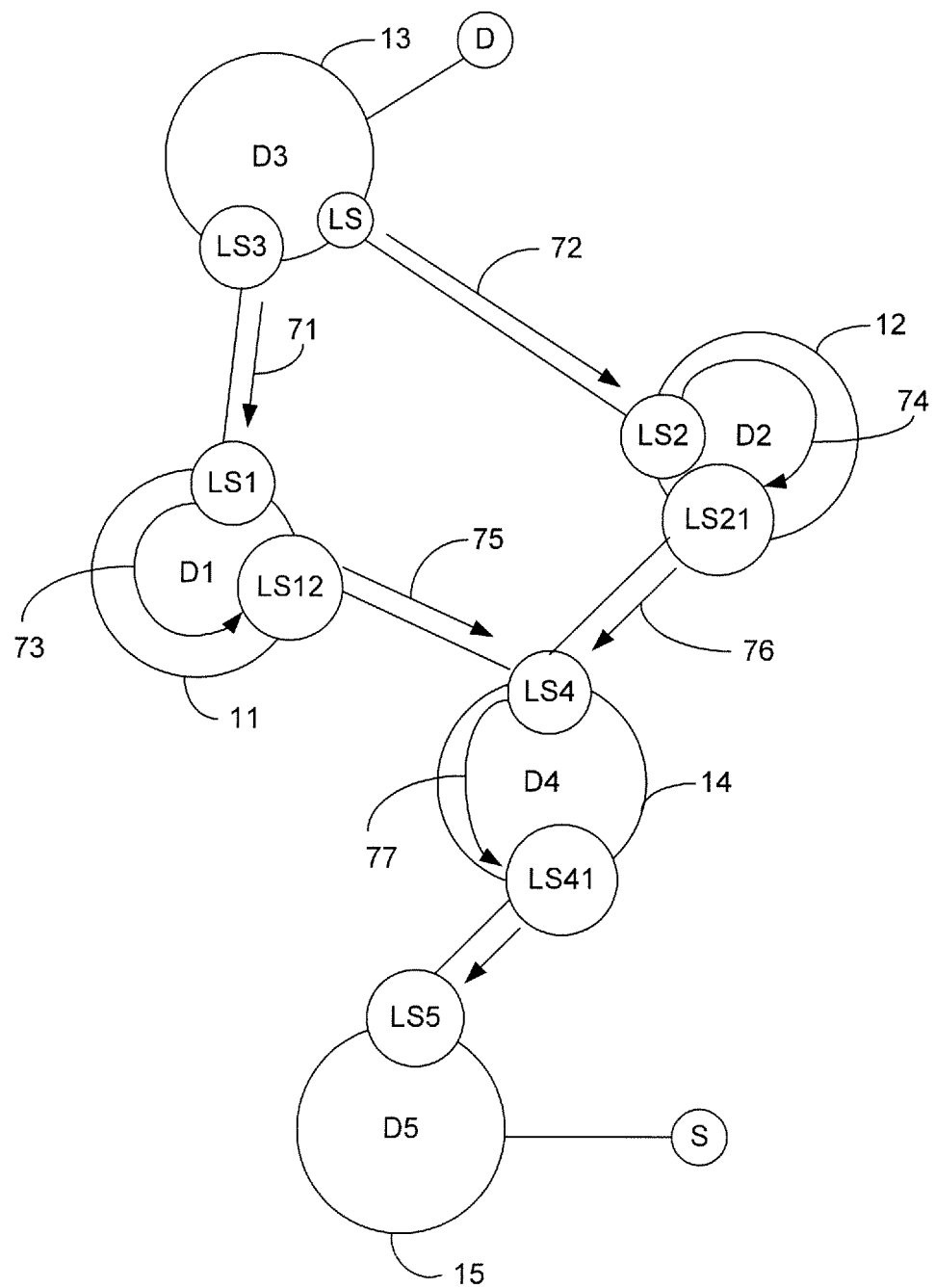
FIG. 7 shows an example implementation of multiple routes being taken in charge between telephony domains.

FIG. 7 shows an example implementation of multiple route handling between the following ITADs: D1, D2, D3, D4, and D5.

On opening the TRIP session, the neighboring LSes exchange the "multiple route capability" message in order to protect against closure of the TRIP sessions and in order to inform peer LSes about multiple route support.

It is assumed that a telephone destination "D" is attached to domain D3 and is managed thereby. This domain D3 can then use an update message to inform (71, 72) its neighbors via TRIP sessions maintained by the location servers LS therein about a telephone route for reaching "D". In this example, the message contains only one route. Nevertheless, it could include a plurality of routes to the same destination or to other destinations.

When LS1 of D1 (and LS2 of D2) receives the update message, it executes the multiple route selection process, and if the route included in the update message is selected, it is stored in the local TRIP routing table. LS1 and LS2 then inform (73, 74) their peers within their own domains about the new route. All of the LSes in D1 have the same local routing table. The same applies to all of the LSes in D2.

The above-described procedure is reiterated (75, 76, 77) between D1 and D4 and between D2 and D4.

Consequently, D4 receives two update messages coming from the LSes of D1 and of D2 relating to the same destination "D". The LS4 receiving (75, 76) these update messages can store both routes in its local TRIP routing table and inform (77) its peer within the same domain D4 about these two new routes. Thus, LS41 has two routes going towards "D". These two routes are propagated to LS5 of D5 via an update message. Consequently, LS5 has two different routes for reaching the destination "D".

Figure 8:
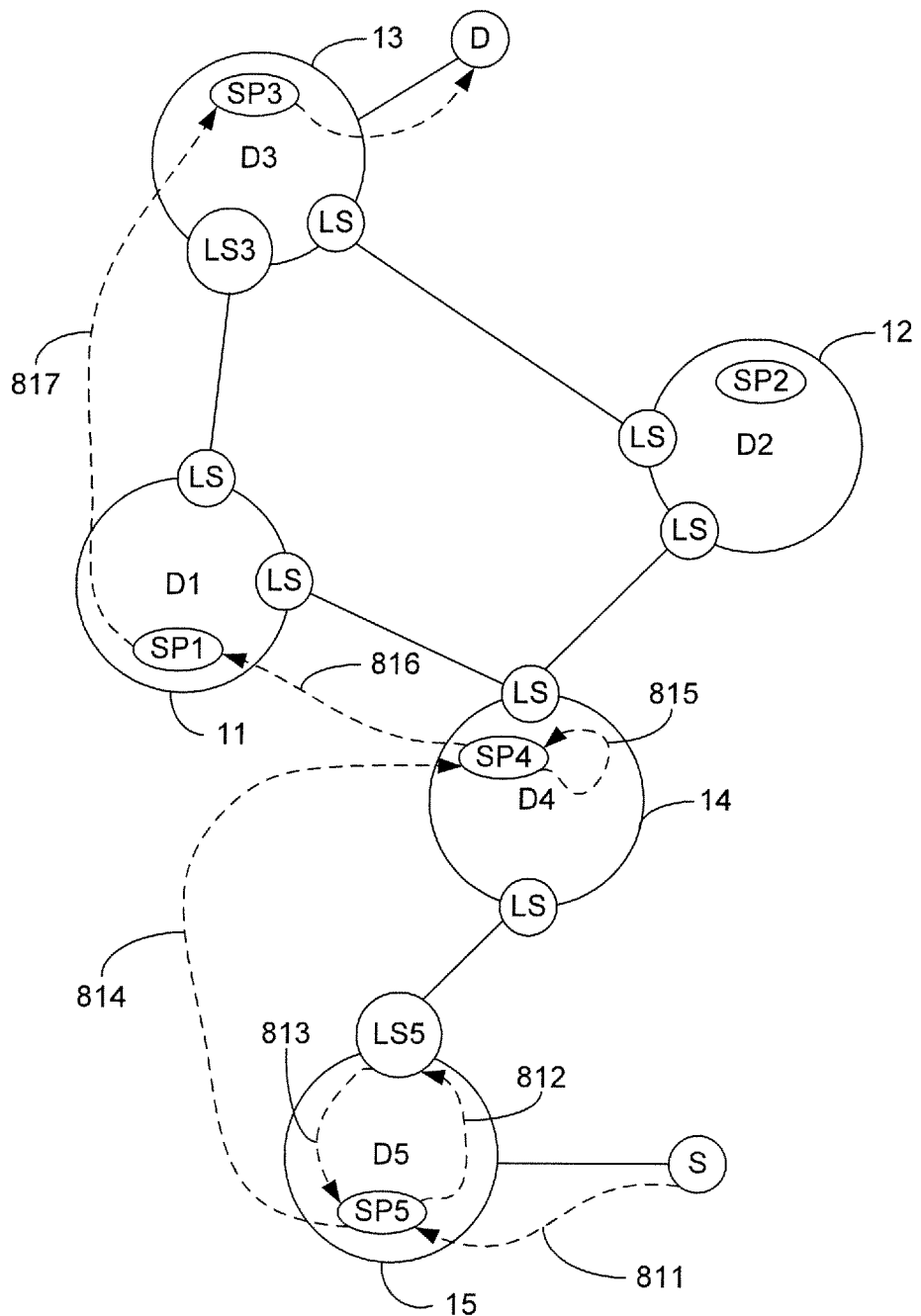
FIG. 8 shows an example implementation of route propagation with the help of the SIP protocol.

With reference to FIG. 8, there follows a description of the process that is implemented when a client "S" seeks to reach "D". To do this, "S" sends (811) an SIP message to the associated proxy server SP5 of domain D5.

In order to route the call, the proxy server consults (812) its client and LS databases. In response to the request, the LS sends (813) a list of routes serving the destination "D" (in this example, two routes are sent to SP5: the route passing via D2 and the route passing via D1, while also specifying the default route or any other useful information).

SP5 can then select one of these two routes for sending the SIP request. In this example, SP5 puts D4, D1, D3 in the "Route" header and sends (814) the SIP request to the SIP proxy server SP4 of D4 (the processing of the "Route" header complies with the SIP specifications, in particular with RFC3261). On receiving the SIP request, the proxy server SP4 of D4 extracts the list of ITADs that the request is to pass through (the "Route" header) and verifies (815) whether its own identifier is in the list:

- if its own identifier is present in the list, then the PS of D4 updates this header by deleting its own identifier from the list and by sending ??? to the PS of the next domain for reaching the first domain of the updated list;
- if its identifier is not present in the list, then the PS of D4 consults its LSes in order to find a route towards the destination "D" and passing through the first domain in the list contained in the SIP "Route" header, assuming that the list is not empty. If the list is empty, then the SP selects a route for reaching the destination and may in turn insert an SIP "Route" header containing the identifiers of the ITADs to be passed through. This list need not necessarily be complete (i.e. it may contain all of the ITADs to be passed through or only some of the ITADs that are to be passed through).

This propagation and verification procedure 814 and 815 is reiterated (816, 817) until the request reaches SP3 in D3 which in turn delivers the SIP request to "D".

4. Annex

RFC3219

| Code | Address Family |
|---|---|
| 1 | "Decimal Routing Number" |
| 2 | "PentaDecimal Routing Numbers" |
| 3 | "E.164 Numbers" |

| Code | Protocol |
|---|---|
| 1 | SIP |
| 2 | H.323-H.225.0-S.931 |
| 3 | H.323-H.225.0-RAS |
| 4 | H.323-H.225.0-Annex-G |

Length:
Corresponds to the length of the "address" field in 8-octets

Address:
Corresponds to an address (prefix) of the type of family given by the "address family" field. The length in octets of the address is variable and is determined by the field length of the route.

Although the present disclosure has been described with reference to one or more examples, workers skilled in the art will recognize that changes may be made in form and detail without departing from the scope of the disclosure and/or the appended claims.

The invention claimed is:

1. A method of propagating routes for routing at least one digital stream towards a destination, the method being performed by a first location server of a first IP telephony domain and suitable for managing locations of clients and telephony routes of said first IP telephony domain, and comprising the following steps:

said first location server receiving, from at least one neighboring server, at least two telephony routes enabling a telephony destination to be reached, referred to as propagation routes, received by at least one propagation message; and said first location server advertising in a further propagation message, according to a protocol configured to exchange IP telephony routes, said at least two propagation routes to at least one second location server of a second telephony domain neighboring the first, said further propagation message comprising a route attribute for each of the at least two propagation routes, which has a flag field indicating whether that propagation route is locally preferred.

2. A method according to claim 1 for propagating routes by the first location server of a first IP telephony domain, the method comprising:

a prior step of negotiating a multiple telephony route management capability as a function of at least one predetermined parameter with said at least one second location server; and a prior step of negotiating a number of propagation routes to exchange serving a common destination between said first location server with said at least one second location server.

3. A method according to claim 1 for propagating routes by the first location server of a first IP telephony domain, wherein said step of receiving at least two propagation routes enabling said destination to be reached comprises the following steps:

receiving at least one update message containing said at least two propagation routes;

selecting amongst said propagation routes at least one route for conserving in accordance with at least one predetermined propagation route selection parameter; and adding said at least one route for conserving to a telephony route database.

4. A propagation method according to claim 3, wherein said step of selecting at least one route for conserving takes account of the flag fields respectively associated with said at least two propagation routes.

5. A method of signaling routes towards a telephony destination, the method being performed by a first proxy server of a first IP telephony domain and suitable for processing signaling messages received from clients of said first telephony domain or from another proxy server, said IP telephony domain including at least one first location server suitable for managing locations of clients and telephony routes of the first telephony domain, and said method comprising the following steps:

said first proxy server questioning said first location server about telephony routes enabling said destination to be reached, referred to as service routes;

said first proxy server receiving from said first location server at least two service routes, each service route comprising a route attribute having a flag field indicating whether that service route is locally preferred;

said first proxy server selecting a route amongst said at least two service routes received from said first location server, referred to as a selected service route, by taking into account the flag fields of the at least two service routes;

said first proxy server inserting into a first signaling message a list of successive IP telephony domains through which said selected service route passes; and said first proxy server sending said first signaling message to the proxy server of an IP telephony domain placed in said list.

6. A method of signaling according to claim 5, wherein said first signaling message is implemented using an SIP protocol, and wherein the message includes at least one attribute serving to specify a list of IP telephony domains through which said selected service route passes.

7. A method according to claim 5, the method comprising:

a step of receiving a second signaling message coming from a second proxy server;

a step of extracting from said second signaling message said list of IP telephony domains through which said selected service route passes;

a step of updating said at least one list of IP telephony domains when said first domain attached to said first proxy server is identified within said list; and a step of searching for a route serving said destination when said first domain is not identified within said list.

8. A location server of a first IP telephony domain, and suitable for managing locations of clients and telephony routes of said first IP telephony domain, the server comprising means for:

receiving, from at least one neighboring location server, at least two telephony routes enabling a telephony destination to be reached, referred to as propagation routes, received by a first propagation message; and advertising said at least two routes in a further propagation message, according to a protocol configured to exchange IP telephony routes, to at least one second location server of a second telephony domain neighboring the first telephony domain, said further propagation message comprising a route attribute having a flag field indicating whether that propagation route is locally preferred.

9. A proxy server of a first IP telephony domain, and suitable for processing signaling messages received from clients of said first telephony domain or from another proxy server, said IP telephony domain including at least one first location server suitable for managing locations of clients and telephony routes of said first IP telephony domain, said proxy server comprising a processor configured for:

questioning said first location server about telephony routes enabling said destination to be reached, referred to as service routes;

receiving from said first location server at least two service routes, each service route comprising a route attribute having a flag field indicating whether that service route is locally preferred;

selecting a route for propagation amongst said at least two service routes received from said first location server, referred to as a selected service route, by taking into account the flag fields of the at least two service routes;

inserting into a first signaling message a list of successive IP telephony domains through which said selected service route passes; and sending said first signaling message to the proxy server of an IP telephony domain placed at a head of said list.

10. A proxy server according to claim 9, wherein the processor further configured for:

receiving a second signaling message coming from a second proxy server;

extracting from said second signaling message said list of IP telephony domains through which said selected service route passes;

updating said at least one list of IP telephony domains when said first domain attached to said proxy server is identified within said list; and searching for a telephony route serving said destination when said first domain is not identified within said list.

11. A non-transitory computer-readable medium comprising a computer program product stored thereon, the product comprising program code instructions for executing a method of propagating routes for routing at least one digital stream towards a destination, when executed on a computer, the method being performed by a first location server of a first IP telephony domain and suitable for managing locations of clients and telephony routes of said first IP telephony domain, and comprising the following steps:

said first location server receiving, from at least one neighboring location server, at least two telephony routes enabling a telephony destination to be reached, referred to as propagation routes, received by at least one propagation message; and said first location server advertising in a further propagation message, according to a protocol configured to exchange IP telephony routes, said at least two propagation routes to at least one second location server of a second telephony domain neighboring the first, said further propagation message comprising a route attribute for each of the at least two propagation routes, which has a flag field indicating whether that propagation route is locally preferred.

12. A non-transitory computer-readable medium comprising a computer program product stored thereon, the product comprising program code instructions for executing a method of signaling routes towards a telephony destination, when executed on a computer, the method being performed by a first proxy server of a first IP telephony domain and suitable for processing signaling messages received from clients of said first telephony domain or from another proxy server, said IP telephony domain including at least one first location server suitable for managing locations of clients and telephony routes of the first telephony domain, and said method comprising the following steps:

said first proxy server questioning said first location server about telephony routes enabling said destination to be reached, referred to as service routes;

said first proxy server receiving from said first location server at least two service routes, each service route comprising a route attribute having a flag field indicating whether that service route is locally preferred;

said first proxy server selecting a route amongst said at least two service routes received from said first location server, referred to as a selected service route, by taking into account the flag fields of the at least two service routes;

said first proxy server inserting into a first signaling message a list of successive IP telephony domains through which said selected service route passes; and said first proxy server sending said first signaling message to the proxy server of an IP telephony domain placed in said list.

13. A method comprising:

sending a propagation signal, according to a protocol configured to exchange IP telephony routes, from a first location server suitable for managing locations of clients and telephony routes of a first IP telephony domain to a second location server of a second IP telephony domain neighboring the first, said propagation signal including a propagation message containing data representative of at least two routes enabling a telephony destination to be reached, said data comprising, for each of said at least two routes, a route attribute comprising a flag field indicating whether that route is locally preferred.

14. A method comprising:

sending from a first proxy server of a first IP telephony domain and suitable for processing signaling messages received from clients of said first telephony domain or from another proxy server, to a second proxy server of a second IP telephony domain, a signaling signal comprising a first signaling message comprising a list of successive IP telephony domains through which a selected service route enabling a telephony destination to be reached passes; and selecting said service route by said first proxy server amongst at least two service routes received by said first proxy server from a first location server suitable for managing locations of clients and telephony routes of the first telephony domain and said second proxy server being placed in said list, wherein each of the at least two service routes received by the first proxy server comprises a route attribute including a flag field indicating whether that service route is locally preferred.

* * * * *

UNITED STATES PATENT AND TRADEMARK OFFICE
CERTIFICATE OF CORRECTION

PATENT NO.       : 8,514,843 B2                                          Page 1 of 1
APPLICATION NO.  : 12/297771
DATED            : August 20, 2013
INVENTOR(S)      : Boucadair et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1249 days.

Signed and Sealed this
Fifteenth Day of September, 2015

Michelle K. Lee
*Director of the United States Patent and Trademark Office*